United States Patent [19]
Jehle et al.

[11] Patent Number: 5,095,312
[45] Date of Patent: Mar. 10, 1992

[54] IMPULSE TRANSMITTER AND QUANTUM DETECTION RADAR SYSTEM

[75] Inventors: Robert E. Jehle, Silver Spring; David F. Hudson, Clarksburg, both of Md.

[73] Assignee: The United States of America as represented by the Secretary of the Navy, Washington, D.C.

[21] Appl. No.: 687,602

[22] Filed: Apr. 12, 1991

[51] Int. Cl.⁵ .................................... G01S 13/86
[52] U.S. Cl. ........................ 342/21; 342/54; 342/88
[58] Field of Search ..................... 342/21, 54, 88

[56] References Cited

U.S. PATENT DOCUMENTS

| | | | |
|---|---|---|---|
| 2,946,050 | 7/1960 | Wathen | 342/88 X |
| 3,503,680 | 3/1970 | Schenkerman | 342/88 X |
| 3,790,278 | 2/1974 | Buczek et al. | 342/54 X |
| 4,126,860 | 11/1978 | Sullivan et al. | 342/21 X |
| 4,688,041 | 8/1987 | Cronson et al. | 342/21 X |

Primary Examiner—Gilberto Barrón, Jr.
Attorney, Agent, or Firm—Kenneth E. Walden; Jacob Shuster

[57] ABSTRACT

Pulses of short duration are radiated by an impulse radar transmitter within time domain intervals under control of a clock to monitor a moving target from which echo pulses are reflected. The echo pulses received are measured by a quantum detector in terms of photon energy levels to supply signal data processed during periods between said time domain intervals.

7 Claims, 3 Drawing Sheets

IMPULSE TRANSMITTER AND QUANTUM DETECTION RADAR SYSTEM

BACKGROUND OF THE INVENTION

This invention relates generally to radar systems for monitoring moving targets by emission of radiant energy pulses and reception of target reflected echo pulses to provide data with respect to range and velocity of the target.

Pulse radar system heretofore involved generation of a continuous RF carrier wave by a transmitter that is intermittently operated so as to radiate RF pulses toward the target from which reflected echo pulses received by an antenna are fed to a superhetrodyne radio receiver. The received pulses were demodulated and typically processed to provide signal measurement data from which target range and velocity are calculated.

In an effort to improve operational reliability of pulse echo receiving systems under a wide range of adverse environmental conditions, various interrelated transmitter and pulse timing control arrangements have been proposed as disclosed for example in U.S. Pat. Nos. 3,794,996 to Robbins et al. U.S. Pat. No. 3,983,422 to Nicolson et al., on the other hand, proposes a control arrangement for an interrelated transmitter and pulse echo receiving system to eliminate circuit adjustments. Such prior pulse radar systems have never-the-less had various operational noise problems due to target scintillations and multipath errors as well as limited range accuracy. They have also been susceptible to electronic jamming and stealth techniques.

It is therefore an important object of the present invention to provide a pulse radar system with interrelated transmitter and receiver pulse timing controls which overcomes the aforementioned noise problems, including those externally induced by deliberate jamming and use of stealth techniques.

SUMMARY OF THE INVENTION

Current impulse radar systems of the short pulse duration type, involve the detection of targets by the processing of data on the wave nature of electromagnetic radiation. According to the present invention the photonic nature of the electromagnetic radiation is exploited. Toward that end a wideband type of microwave impulse transmitter under control of a laser device is rendered operative to output and radiate narrow pulses of picoseconds duration with reduced peak power during spaced time domain intervals and target reflected echo pulses are picked up by an antenna and fed to a wideband receiver. Receiver captured photons of energy above a predetermined threshold level signifying reflection of the echo pulses from the target being monitored, are detected by means of a quantum detection arrangement in accurately clocked synchronism with operation of the impulse transmitter to supply timed measurement data to a data processor through which signal processing between the time domain intervals of the impulse transmitter reduces the effects of clutter and thereby isolates the target to be detected. Spatial data is stored, measured in terms of photons and compared by the data processor to provide readout of the target information.

BRIEF DESCRIPTION OF THE DRAWING FIGURES

Other objects, advantages and novel features of the invention will become apparent from the following detailed description of the invention when considered in conjunction with the accompanying drawing wherein.

DETAILED DESCRIPTION OF THE PREFERRED EMBODIMENT

Figure 1:
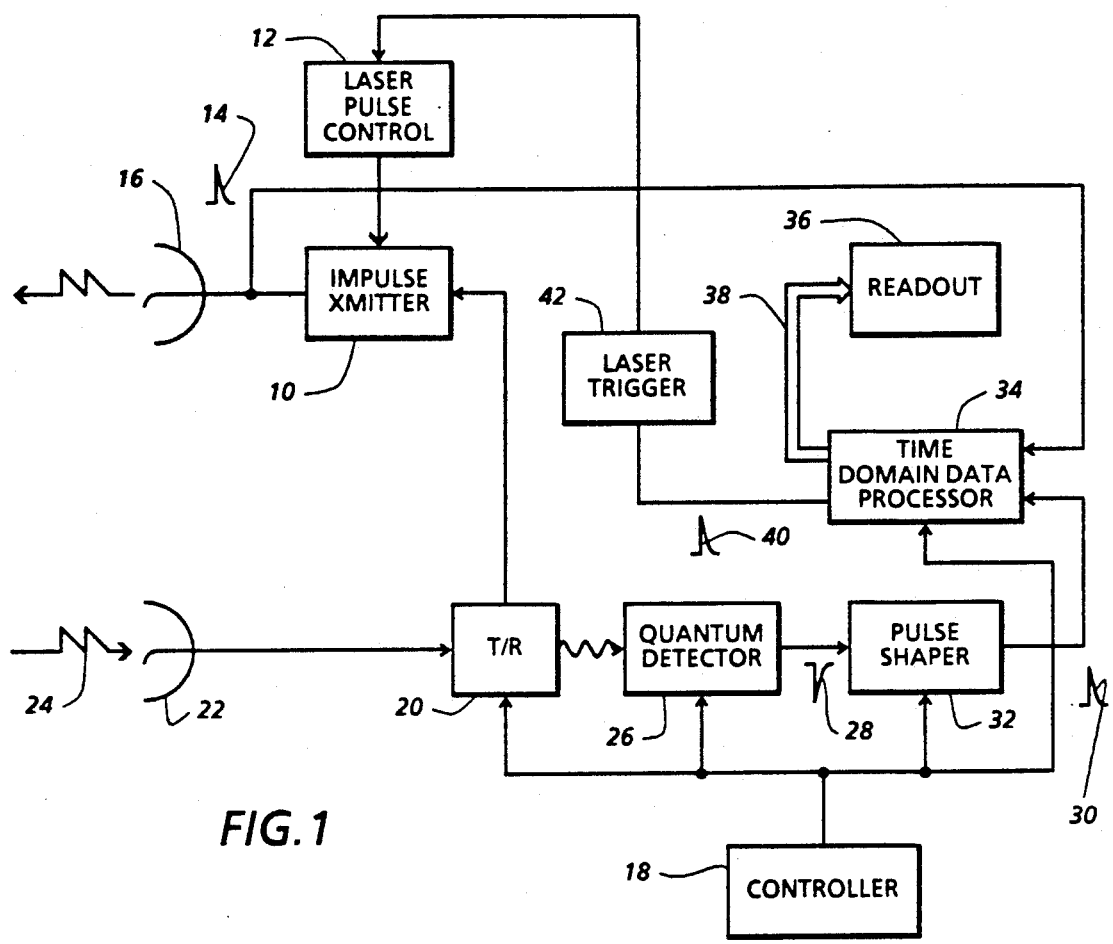
FIG. 1 is a schematic block diagram of a pulse radar system in accordance with a first embodiment of the invention.

Referring now to the drawing in detail, an impulse radar transmitter 10 is shown in FIG. 1 under control of a laser control component 12 to produce extremely fast rising pulses 14 of short duration (pico seconds). Such output of the transmitter 10 is radiated out into space by means of an antenna 16 under control of signals received from a controller 18. A transmit/receive switch assembly 20 protects a signal receiving antenna 22 and associated receiver circuitry in close proximity to the transmitting antenna 16. The switch operates in a conventional manner to block reception of signals through antenna 22 when the transmitter 10 is producing its narrow output pulses 14. After transmission of such an output pulse 14, the receiving antenna 22 is rendered operative and awaits arrival of resulting target reflected radiation 24 measured in terms of the energy levels of photons directed by the switch assembly 20 to a quantum detector 26. The detector 26 may be turned on or off by means of the controller 18.

The echoed signal energy captured by the receiving antenna 22 are sensed by the quantum detector 26 to produce an electric pulse 28, as depicted in FIG. 1, that is converted into a sharp pulse 30 by pulse shaper 32. The sharp pulse 30 is thereby operative through a data processor 34 of a time domain type to accurately control clocked operation initiated by the aforementioned transmitted pulse from transmitter 10.

Successive input pulses 30 received by the data processor 34 from pulse shaper 32 produces an accumulation of data from which range, velocity and velocity rate of a moving target is computed as output data exhibited by readout 36 during periods between reception of target reflected echo pulses. The data processor 34 also supplies a timing pulse 40 to a laser trigger device 42 through which commands are generated and fed to the laser pulse control 12 by means of which intermittent operation of the impulse transmitter 10 is dictated in order to establish periods between intermittent transmitter operational intervals during which signal processing and computational functions of the data processor 34 are performed, to produce the output data transmitted by data bus 38 to readout 36 as diagrammed in FIG. 1.

Figure 2:
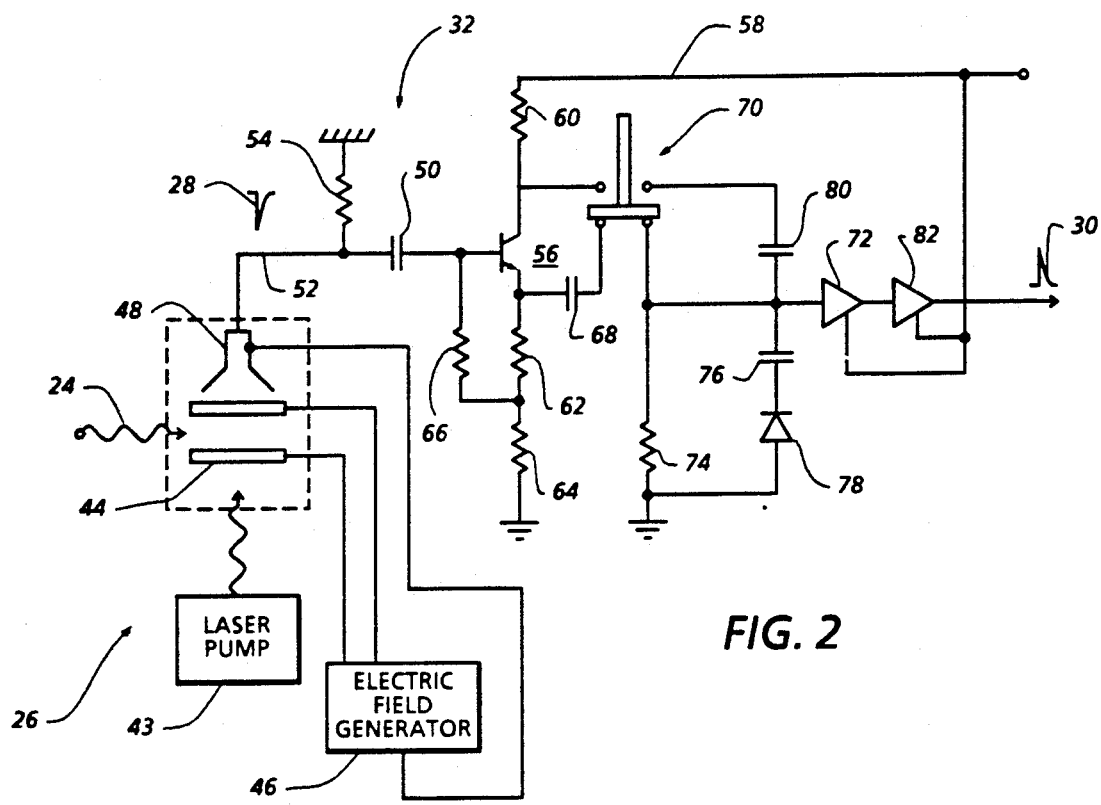
FIG. 2 is a more detailed circuit diagram of a portion of the system diagrammed in FIG. 1.

As depicted in FIG. 2, quantum device 26 is of a known Rydberg detector type capable of sensing incident photons captured by the receiving antenna 22. In this type of detector, photons pass through a window into an enclosed body of gas excited to an energy level (N) by the optical pumping action of a laser pump 43. The excited state of the gas is chosen so that its energy level (N) is adjacent to an immediately higher energy level (M) so that the energy difference between (M) and (N) is close that of the photons to be sensed. Toward that end, the energy level difference between the energy level (E) of such photons and the excited state of the gas at energy level (N) is adjusted to a resonance condition in accordance with the Stark effect involving an electric field established by electrodes 44 connected to a field generator 46. In such resonance condition, a photon of energy (E) has a high probability of being absorbed by atoms of the gas preadjusted to the excited state at energy level (N) so that it will be excited to the next higher energy level (M) indicating the detection of photons of the incident radiation 24 reflected from a target. Selective ionization of the gas in the quantum detector 26 by increasing the electric field above the stark effect value through electrodes 44, involves a known technique which readily enables one to distinguish between the gas excitation states at energy levels (N) and (M) through a conventional channel multiplier 48 as depicted in FIG. 2. The multiplier 48 in response to electrons or ions produced by the enhanced electric field, produces the pulse 28 aforementioned which undergoes a pulse shaping action in the pulse shaper 32.

With continued reference to FIG. 2, the pulse shaper 32 is coupled by capacitor 50 to the output line 52 from the channel multiplier 48 within which the pulse 28 appears at grounded resistor 54. The pulse 28 is accordingly applied to the base of a transistor 56 in an emitter-follower circuit arrangement between power line 58 and ground through series connection of the transistor collector and emitter to load resistor 60 and interconnected resistors 62 and 64. The junction between resistors 62 and 64 is coupled by a resistor 66 to the transistor base for operation of the emitter-follower circuit at cut-off under a high input impedance and with a predetermined gain at the output emitter coupled by capacitor 68 and switch assembly 70 to a signal amplifier 72. The output pulse fed to amplifier 72 is differentiated by capacitor 68 and grounded resistor 74 while unwanted negative overshoots are clipped by series connected capacitor 76 and grounded diode 78. If a different output polarity is desired, the switch assembly 70 is displaced to the other operative position to obtain an output from the transistor collector applied through a capacitor 80 to the amplifier 72. The output of amplifier 72 is applied to a pulse amplifier 82 of the pulse shaper from which the sharp pulse 30, aforementioned, is fed to the data processor 34.

Figure 3:
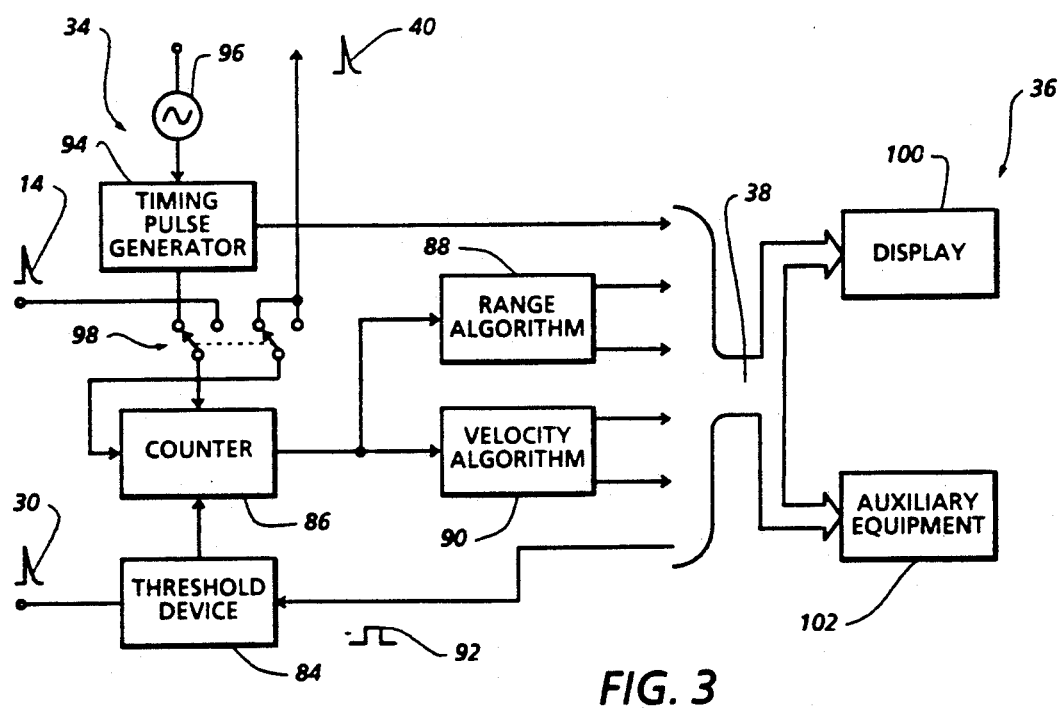
FIG. 3 is a more detailed block diagram of another portion of the system diagrammed in FIG. 1.

As diagrammed in FIG. 3, the pulses 30 extracted from incident radiation 24 are fed to a threshold device 84 in the data processor 34 through which signal clutter produced by photons reflected from objects adjacent to the target are separated from target reflected photons by establishing a threshold level factor for photon count intensity above which a trigger pulse is fed to a time of flight counter 86. The counter 86 measures the time between such threshold trigger pulse and the laser trigger pulse 40. The time measurement outputs of the counter 86 are processed in accordance with algorithms 88 and 90 as diagrammed in FIG. 3 to provide the output data as aforementioned in connection with range, velocity and velocity rate of a moving target. Such output data is accompanied by video pulses 92 formed by a one-shot multivibrator and pulse stretcher in the threshold device 84 and are transmitted through data bus 38 to readout 36 to signify a target on the readout display screen 100. The readout 36 may also include auxiliary equipment 102 as shown to which the readout data is fed.

The timing measurements of counter 86 are made with reference to timed signal outputs of a timing pulse generator 94 fed to the counter 86 through a switch 98 in one mode of counter operation. The timing pulse generator 94 is operated by a master oscillator 96 connected to the power supply to also produce the timing pulse signal 40 fed to the laser trigger 42 aforementioned in connection with FIG. 1, and to the data bus 38 for time control of the readout display and equipment. The mode switch 98 when displaced to its other operative position, feeds output pulse 14 from the transmitter 10 to the counter 86 as a reference input without any timing signal from the generator 94. Measurement of time between trigger pulse 40 and a received target signal is thereby effected with greater accuracy.

Figure 4:
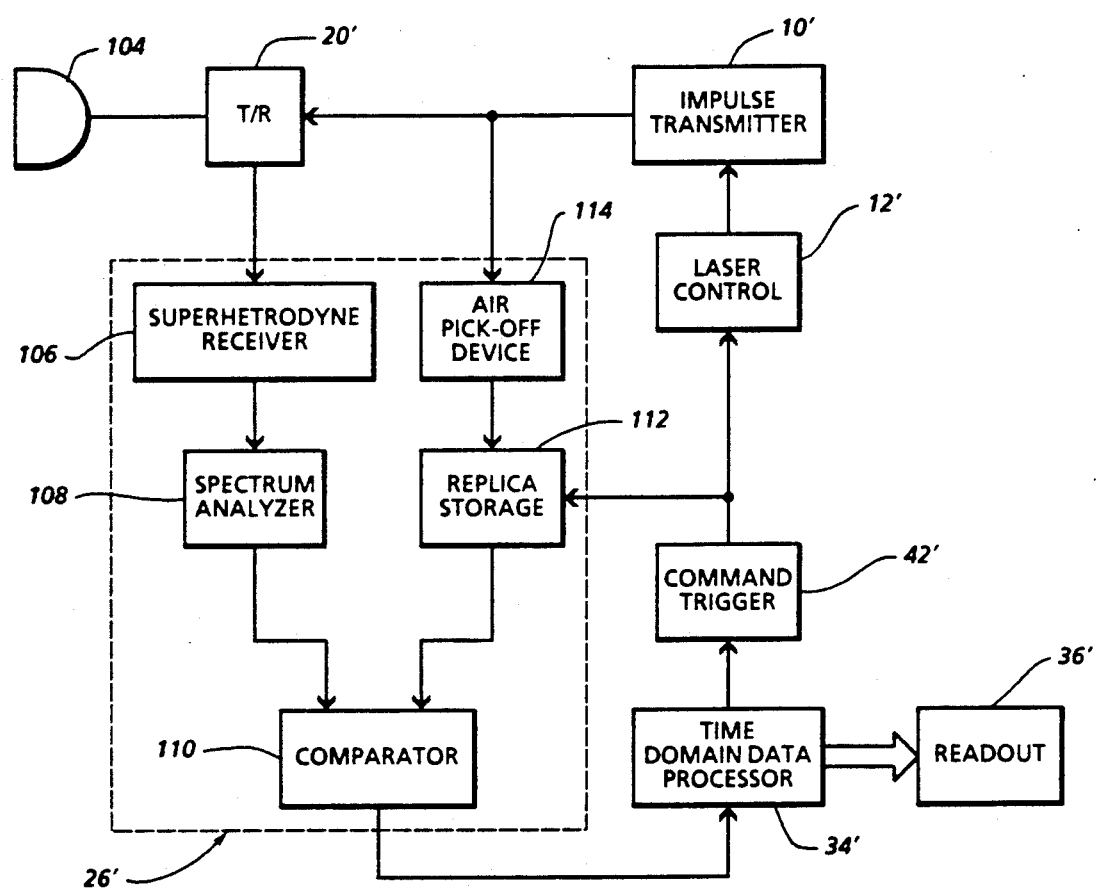
FIG. 4 is a schematic block diagram of a pulse radar system in accordance with a second embodiment of the invention.

As an alternative, a common antenna 104 may be utilized through a transmitter/receiver switch 20' as diagrammed in FIG. 4 for an impulse transmitter 10' and a receiver assembly 26' to measure target reflected radiation in terms of photons. The receiver assembly 26' in the embodiment shown in FIG. 4 includes an ultra wideband superheterodyne receiver 106 having a spectrum analyzer 108 associated therewith, the output of which is fed to a comparator 110. The other input of comparator 110 is derived from a storage 112 of transmitter pulse replica reproduced on command from the laser pulse trigger 42' controlling operation of the transmitter 20'. The transmitter pulse replica is captured in storage 112 from the output of transmitter 10' through an air pick-up device 114 as diagrammed in FIG. 4. The output of comparator 110 is fed to a time domain data processing system 34' from which data output is fed to readout 36' and a trigger timing output to the command trigger 42' in order to establish the periods between echo pulses received as hereinbefore described with respect to FIGS. 1-3.

Figure 5:
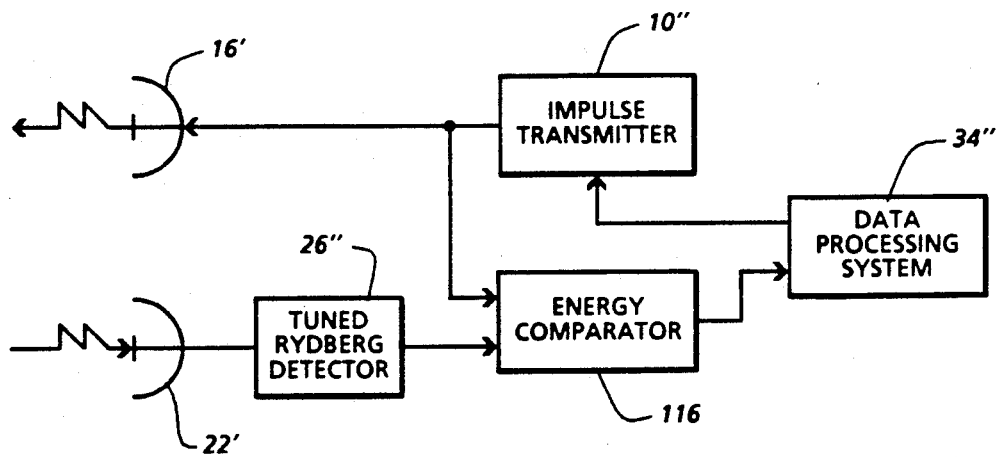
FIG. 5 is a schematic block diagram of a pulse radar system in accordance with a third embodiment of the invention

Generally similar objectives are also achieved through a data processing system 34" as diagrammed in FIG. 5 to control operation of an impulse transmitter 10" involving capture by a receiving antenna 22' of photons doppler shifted by target motion. The pulse output of transmitter 10" is accordingly radiated by a separate antenna 16'. The transmitter output is also fed to one input of an energy comparator 116, the other input of which is derived from the receiving antenna 22' through a tuned Rydberg type of quantum detector 26".

Numerous other modifications and variations of the present invention are possible in light of the foregoing teachings. It is therefore to be understood that within the scope of the appended claims the invention may be practiced otherwise than as specifically described.

We claim:
1. In a radar system for monitoring a moving target involving emission of radiant energy reflected from the target, measurements of the reflected echo pulses received and data processing of said measurements to obtain readout of target information, the improvement residing in the steps of: limiting said measurements to predetermined periods between said reception of the echo pulses by detection of photons at an energy level characterizing the echo pulses and confining said emis- sion of the radiant energy to intervals of reduced duration within a time domain during said predetermined periods.

2. The improvement as defined in claim 1 wherein said data processing is initiated within said time domain.

3. In a radar system for monitoring a moving target, having transmitter means for emitting radiant energy, antenna means for reception of echo pulses of the radiant energy reflected from the target, receiver means operatively connected to the antenna means for measurement of the reflected echo pulses and computational means for obtaining measurement data with respect to the target from said measurement of the echo pulses, the improvement residing in said receiver means including means detecting photons captured by the antenna means at a threshold energy level characterizing the echo pulses for limiting said measurement to predetermined time domain periods between said reception of the echo pulses to provide said measurement data, and impulse control means operatively connected to the photon detecting means through the computational means for limiting operation of the transmitter means in emitting the radiant energy to intervals of reduced duration and establish said predetermined time domain periods.

4. The improvement as defined in claim 3 wherein said computational means comprises means for processing said measurement data from the quantum detector means within the time domain periods.

5. The system as defined in claim 3 wherein said photon detecting means comprises a quantum detector, switch means interconnecting the quantum detector with the transmitter means for blocking signal reception by the quantum detector through the antenna means during said operation of the transmitter means in emitting the radiant energy and pulse shaping means operatively connecting the quantum detector to the computational means for establishing said predetermined time domain periods.

6. The system as defined in claim 5 wherein said quantum detector includes as enclosed body of gas into which the photons gas, laser pump means for exciting said body of gas to a reference energy level (N) different from the threshold energy level (E) of the photons, adjusting means within said body of gas for establishing a differential energy level (M) in response to ionization thereof by absorption of the photons therein and channel multiplier means for transmitting a photon sensing signal to the pulse shaping means during establishment of the differential energy level (M) of the body of gas while the photons therein are at said threshold energy level (E).

7. The system as defined in claim 3 wherein said photon detecting means includes an enclosed body of gas into which the photons gas, laser pump means for exciting said body of gas to a reference energy level (N) different from the threshold energy level (E) of the photons, adjusting means within said body of gas for regulating ionization thereof to a photon absorbing energy level (M) and means responsive to establishment of said photon absorbing energy level (M) in the body of gas with the photons therein at said threshold energy level (E) for generating a photon sensing signal transmitted to the computational means.

* * * * *